United States Patent
Gerla et al.

(10) Patent No.: US 6,371,454 B1
(45) Date of Patent: *Apr. 16, 2002

(54) DOWNCOMER TO A PLATE COLUMN

(75) Inventors: Johannes Gerla, Winterthur (CH); Henk Bert Van Westendorp, Elst (NL)

(73) Assignee: Sulzer Chemtech AG, Winterthur (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/445,037

(22) PCT Filed: May 26, 1998

(86) PCT No.: PCT/CH98/00219

§ 371 Date: Nov. 30, 1999

§ 102(e) Date: Nov. 30, 1999

(87) PCT Pub. No.: WO98/55196

PCT Pub. Date: Dec. 10, 1998

(30) Foreign Application Priority Data

Jun. 5, 1997 (EP) .............................. 97810353

(51) Int. Cl.⁷ .................................. B01F 3/04
(52) U.S. Cl. .................. 261/114.1; 261/114.5
(58) Field of Search ............... 261/97, 110, 114.1, 261/114.5

(56) References Cited

U.S. PATENT DOCUMENTS

| | | | |
|---|---|---|---|
| 2,206,507 A | * 7/1940 | Kuhni | 261/114.1 |
| 2,632,638 A | * 3/1953 | Turner | 261/114.5 |
| 3,922,326 A | * 11/1975 | Yoshida et al. | 261/114.1 |
| 3,937,769 A | 2/1976 | Strigle, Jr. | 261/114.1 |
| 4,179,487 A | * 12/1979 | Chekhov et al. | 261/114.1 |
| 4,226,678 A | * 10/1980 | Mende et al. | 261/114.5 |
| 4,550,000 A | * 10/1985 | Bentham | 261/114.1 |
| 4,557,877 A | 12/1985 | Hofstetter | 261/97 |
| 4,627,941 A | * 12/1986 | Bentham | 261/114.1 |
| 5,098,615 A | 3/1992 | Resetarits | 261/114.1 |
| 5,209,875 A | 5/1993 | Miller | 261/114.1 |
| 5,690,708 A | * 11/1997 | Danckaarts et al. | 261/114.1 |
| 5,972,171 A | * 10/1999 | Ross et al. | 261/114.5 |
| 6,116,583 A | * 9/2000 | Agnello | 261/114.5 |

FOREIGN PATENT DOCUMENTS

| | | |
|---|---|---|
| DE | 973623 | 4/1960 |
| DE | 2140899 | 2/1972 |
| EP | 0501615 A2 | 9/1992 |
| NL | 6914633 | 4/1970 |

* cited by examiner

*Primary Examiner*—C. Scott Bushey
(74) *Attorney, Agent, or Firm*—Townsend and Townsend and Crew LLP

(57) ABSTRACT

A downcomer for a plate column, which is largely centrally symmetrically formed with respect to an axis pointing in the column direction, having: a) a run-out aperture which is located within an overflow weir and which contains at least one of: deflection elements, and elements on the overflow weir, for an inflowing liquid/gas mixture for the development of a circular flow; b) a passage part which leads downward; and (c) a cup which is provided at the lower end of the passage part for accumulating the liquid flowing away. The cup contains a plurality of apertures which are designed and arranged in such a manner that a largely uniform distribution of the liquid flowing away results.

13 Claims, 3 Drawing Sheets

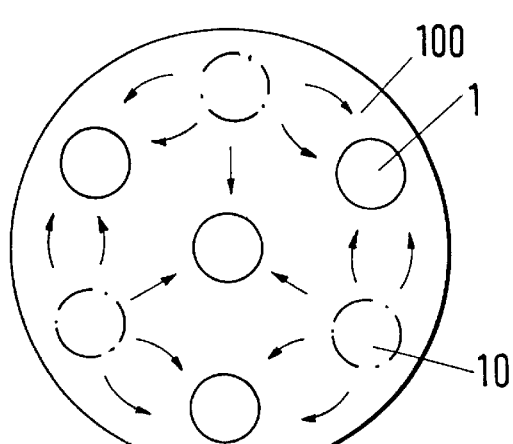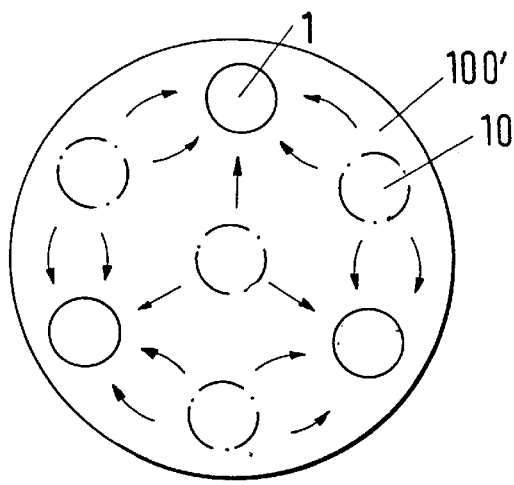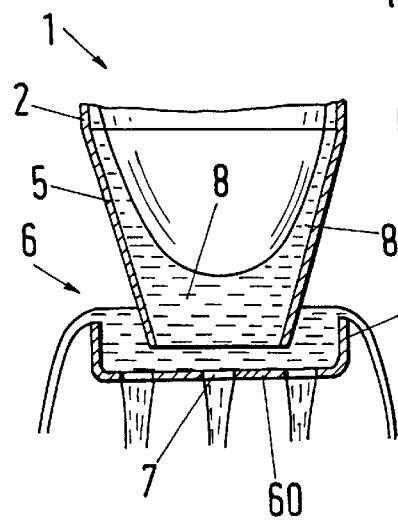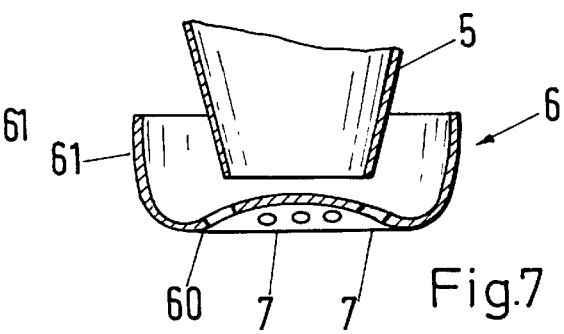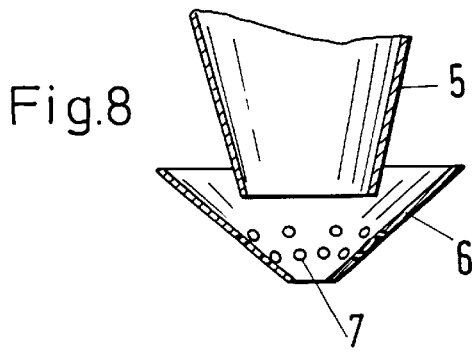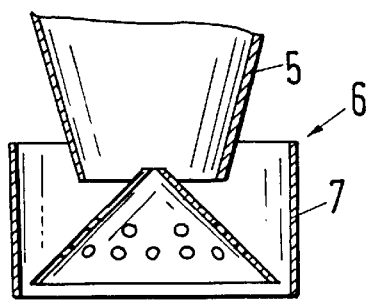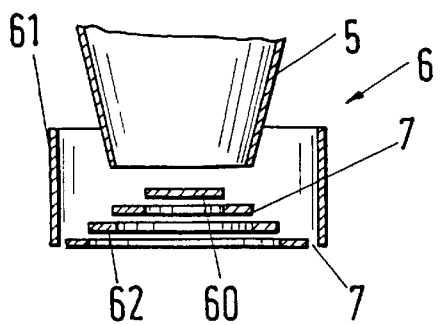

DOWNCOMER TO A PLATE COLUMN

BACKGROUND OF THE INVENTION

1. Field of the Invention

The invention relates to a downcomer for a plate column and to a plate column with downcomers of this kind.

2. Description of the Prior Art

A downcomer of this kind, a so-called "rotary liquid run-out apparatus", is disclosed in DE-A 2 140 899; in this downcomer the liquid running back is set into a rotary movement. In a downcomer the runback flows from one plate ("vapor/liquid contact plate") to the next lower one. Gas (or vapor) which is carried along must be separated from the runback in the downcomer. In the named apparatus the liquid/gas mixture flowing into the downcomer is guided by guide blades in such a manner that the separation process is accelerated thanks to the resulting rotary motion and as a result of the centrifugal force. A cup, which forms the lower closure of the downcomer and which is arranged at a distance above the next lower plate, allows the liquid flowing out of the downcomer to accumulate so that a short-circuit flow of the gas through the downcomer is prevented.

SUMMARY OF THE INVENTION

The object of the invention is to further develop the known downcomer in such a manner that the plates yield an improved effect, i.e. a greater material exchange.

The downcomer in accordance with the invention for a plate column, which is largely centrally symmetrically formed with respect to an axis pointing in the column direction, comprises: a) a downcomer opening which is located within an overflow weir on a plate and which contains the deflection elements for an inflowing liquid/gas mixture for the development of a circular flow; b) a passage part which leads downward; and c) a cup at the lower end of the passage part for accumulating the liquid flowing away. The cup contains a plurality of apertures which are designed and arranged in such a manner that a largely uniform distribution of the liquid flowing off to the next lower plate results.

In the known downcomer only a small hole is provided in the base of the cup in order that the cup can be completely emptied during an interruption in the operation. The greatest portion of the liquid flowing through the downcomer spills over the upper edge of the cup. As a result of this onward conduction of the liquid, an unfavorable "shadow region" results beneath the cup: Liquid is moved away out of this region through the momentum of the onwardly conducted liquid so that, on the one hand, the liquid level is lowered there, and, on the other hand, the liquid is only slowly renewed. As a result of the lowered liquid level the "shadow region" offers less resistance to the rising gas flow, so that a non-uniform gas flow arises and thus the effectivity of the plate is impaired. As a result of the slow renewal, the "shadow region" makes practically no contribution to the material exchange. This defect is not present in the downcomer in accordance with the invention. The liquid flowing through the apertures in the cup base ensures an effective replacement of the liquid in the "shadow region" and an increased resistance to the rising gas flow.

BRIEF DESCRIPTION OF THE DRAWINGS

FIGS. 6–10 show diverse embodiments of the lower closures of downcomers in accordance with the invention.

DETAILED DESCRIPTION OF SPECIFIC EXEMPLARY EMBODIMENT

Figure 1:
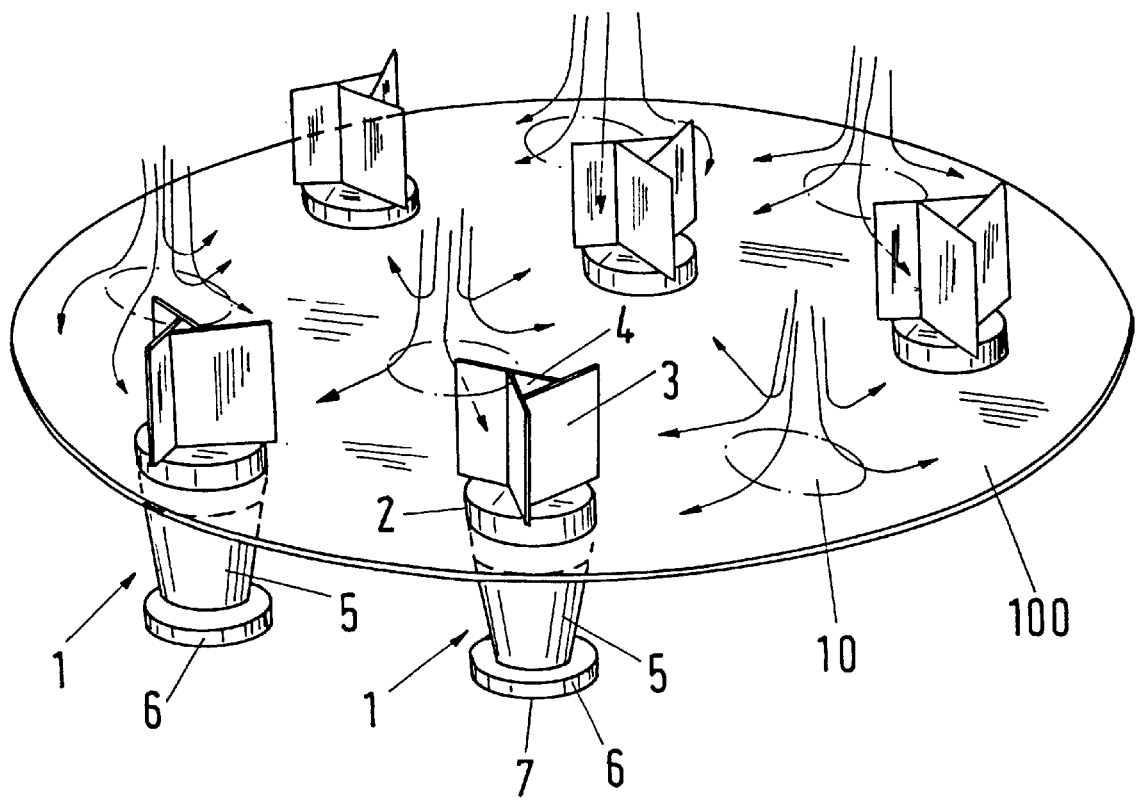
FIG. 1 shows a column plate or base with downcomers in accordance with the invention.

The plate 100 shown in FIG. 1 has five downcomers 1. The areas 10 illustrated in chain-dotted lines are the approach points, at which the runback of the adjacent plate is incident on the plate 100. The arrows indicate the flow direction of the onward flowing liquid. A gas or vapor enters into the liquid from below through non-illustrated gas passage apertures (perforations, valves, bells) so that an exchange of material and heat can take place. The gas temporarily contained in the liquid forms a liquid/gas mixture with it.

The downcomer 1 is designed to be largely centrally symmetric with respect to an axis which points in the direction of the column. Each downcomer comprises an overflow weir 2, a run-out opening 20 and a deflection element 3 for the inflowing liquid/gas mixture. A chimney 4 is located between the deflection elements 3 through which the gas separated out of the mixture can flow off upwardly. The separation of the gas and the liquid takes place in a passage part 5 of the downcomer 2 which tapers or contracts in the downward direction. A cup 6 which is provided for the accumulation of the downwardly flowing liquid forms a lower termination of the downcomer 1. In accordance with the invention the cup 6 is provided with a plurality of apertures 7 which are designed and arranged in such a manner that a largely uniform distribution of the liquid flowing down through the downcomer 1 results. The design must be executed in such a manner that the distribution is uniform over the entire load region and that the liquid is accumulated to a sufficient height by the cup 6 at a minimum operating load so that a short-circuit flow of the gas through the downcomer 1 does not occur. The cup 6 can be a container produced by deep drawing and having the apertures distributed regularly over its base.

Figure 2:
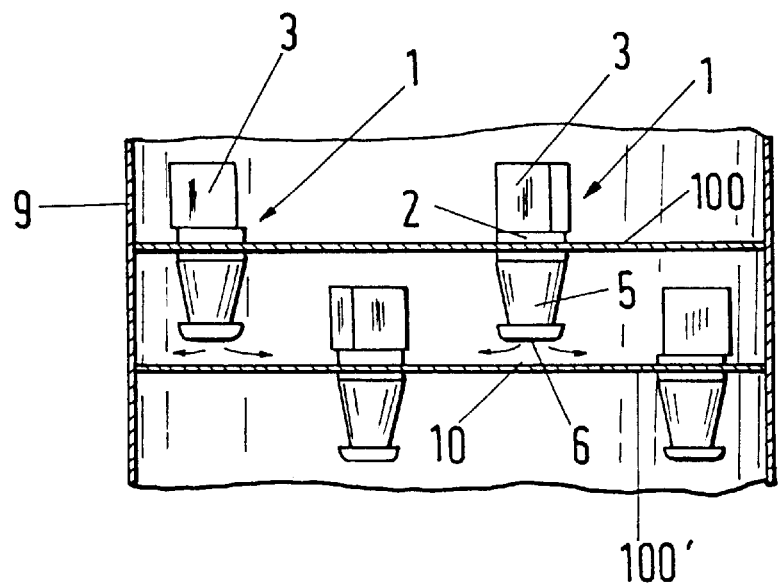
FIG. 2 is a section-wise longitudinal section through a column comprising two plates or bases.

FIG. 2 shows the staggered arrangement of the downcomers 1 of two adjacent plates 100, 100' of a column 9. There is a spacing between the cup 6 and the plate 100' lying beneath it, thanks to which even the region 10 beneath the cup can be used for the material exchange.

Figure 3:
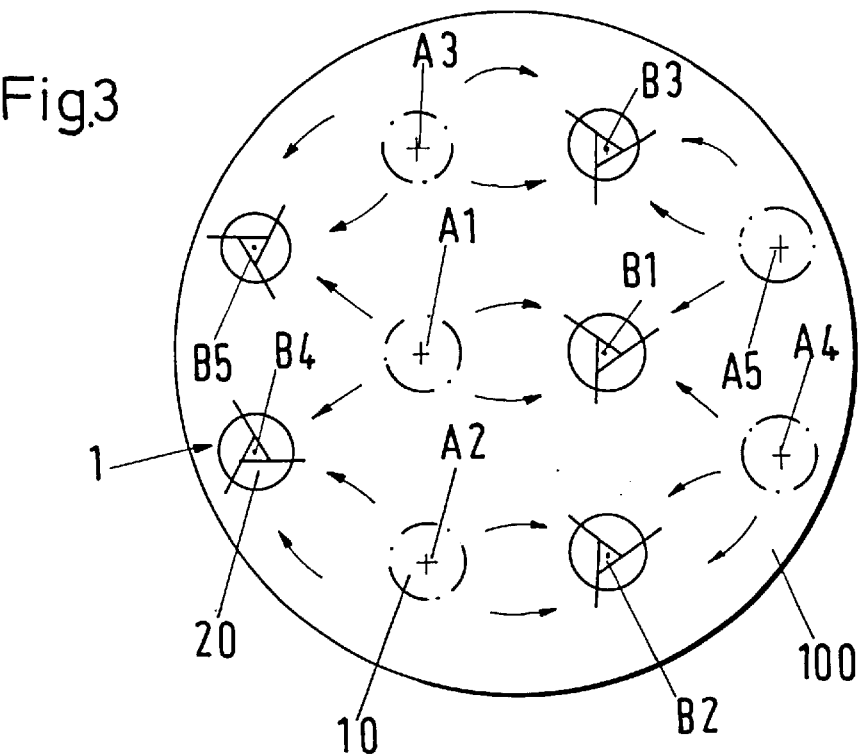
FIG. 3 is a plan view of the plate in accordance with FIG. 1.

As shown in FIG. 3, the downcomers are distributed in such a manner that the midpoints A1, A2, . . . of the approach points have an average spacing in each case with respect to the midpoints B1, B2, . . . of the neighboring run-out points which is largely of the same size for all these midpoints.

Figure 4:
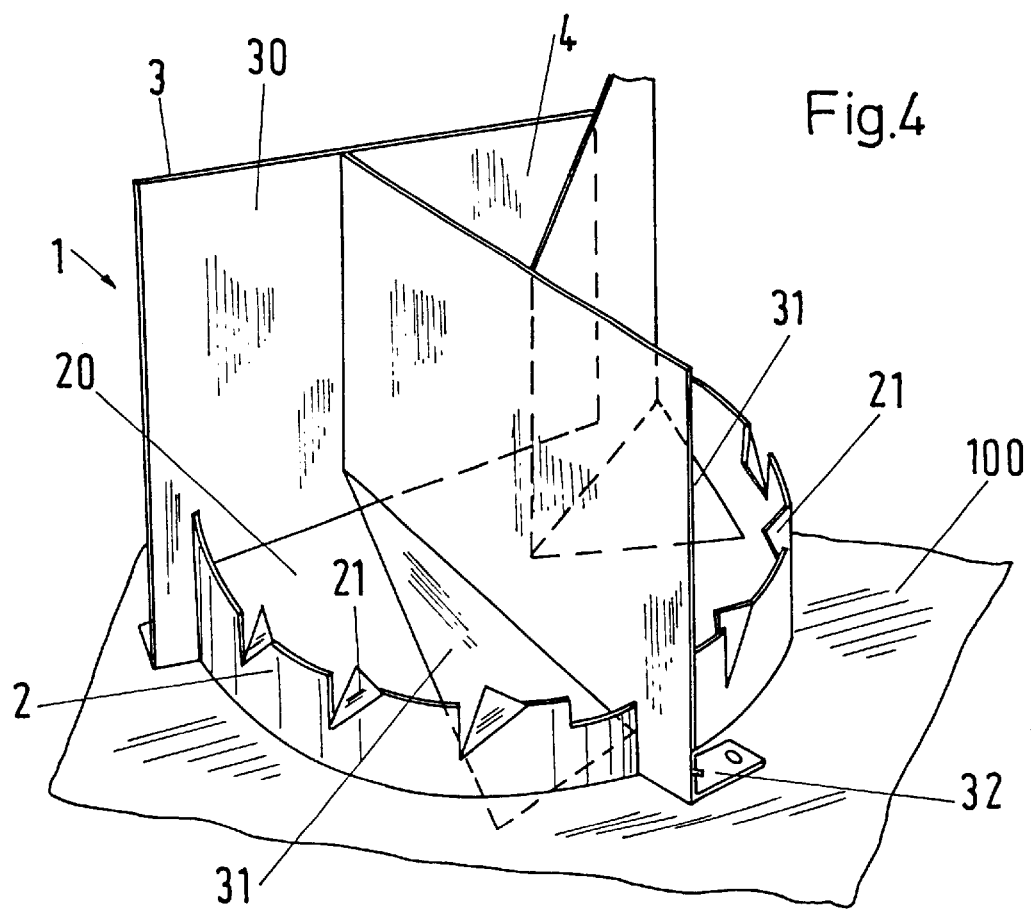
FIG. 4 shows the upper part of a downcomer in accordance with the invention, FIGS. 5a, b show a special arrangement of downcomers of two adjacent plates.

The liquid/gas mixture which flows into the run-out opening 20 is—see FIG. 4—set into a rotary movement by the deflection elements 3, namely by guide walls 30 provided with guide blades 31. The development of the eddying or rotary movement can be improved with additional elements 21 which are arranged at the boundary of the overflow weir 2 and have the form of triangular, inwardly folded surface elements. The elements 21 can also be curved or otherwise shaped, for example rectangularly. The guide blades 31 and thereby the downcomers are secured to the plate or base 100 by angular parts 32.

In plate columns with plates 100, 100' in accordance with FIGS. 1 to 3, all the plates have a similar arrangement of the downcomers. The downcomer arrangements of adjacent plates 100, 100' are oriented differently and indeed in such a manner that displacements of the approach points 10 result with respect to the run-out points 20.

FIGS. 5a and 5b show the downcomer arrangement for a further exemplary embodiment: the downcomers 1 of adjacent plates 100, 100' are arranged in a complementary manner; the numbers of the approach and run-out points per plate are different (4 and 3 downcomers respectively).

FIG. 6 shows a longitudinal section through the lower part of a downcomer in accordance with the invention with a passage part 5 and a cup 6. The deep drawn cup 6 has a planar base 60 in the middle region and a cylindrical wall 61 at the periphery. The apertures 7 are formed as circular holes. Runback liquid 8 moves in the passage part 5 in the form of an eddy, thanks to which a liquid layer 80 forms on the inner wall of the passage part 5 in which the runback has a lengthened dwell time due to the circular movement. From the layer 80 gas which is carried along—not illustrated—is removed from the runback, with the separation process being accelerated by the centrifugal force acting. The liquid 8 accumulated by the cup 6 prevents the gas from passing through the downcomer 1. The liquid 8 flows with a uniform distribution through the holes 7 to the lower-lying plate 100'. A portion of the liquid 8 can also flow off over the edge of the side wall 61. The outflow openings 7 for the runback can be of any shape desired.

FIG. 7 shows a second exemplary embodiment with a deep drawn cup 6. Here the base 60 of the cup is arched upwards in the middle.

In accordance with the exemplary embodiments illustrated in FIGS. 8 and 9 the cup 6 comprises a part in the shape of a cone or a truncated cone in which the apertures 7 are arranged. It can be largely formed by the part 6 in the shape of a cone or a truncated cone, with the apex of the cone pointing downward: FIG. 8. The apex of the part 60' in the shape of a cone or a truncated cone can also point upward if a cylindrical wall 61 forms the lateral boundary of the cup: FIG. 9.

Finally, FIG. 10 shows an exemplary embodiment in which the cup 6 comprises ring-shaped regions 62, between which slit-shaped apertures 7 are arranged.

What is claimed is:

1. A downcomer for a plate column, which is largely centrally symmetrically formed with respect to an axis pointing in the column direction, the downcomer comprising:
   a run-out opening which is located on a plate within an overflow weir;
   deflection elements which form a chimney for the upward flow of gas;
   elements for the development of a circular flow in an incoming gas/liquid mixture;
   a passage part which leads to a next lower plate; and
   a cup at the lower end of the passage part for the accumulation of liquid flowing off;
   wherein the cup contains a plurality of apertures which are designed and arranged in such a manner that a largely uniform distribution of liquid flowing away to the next plate results; and
   wherein the elements for the development of a circular flow in an incoming liquid/gas mixture are formed by at least one of the following:
     parts located at the chimney, and
     parts located at the overflow weir of the runout.

2. A downcomer in accordance with claim 1 wherein the cup is a vessel which is produced by deep drawing, with apertures being regularly distributed over its base.

3. A downcomer in accordance with claim 2 wherein the cup has a planar base in its middle region and a cylindrical wall at its periphery.

4. A downcomer in accordance with claim 2 wherein the apertures are circular holes.

5. A plate column with downcomers in accordance with claim 1, with a plurality of downcomers being provided per plate and with gas passage apertures for an exchange of material being arranged at all regions which are free of ran-out points, wherein the downcomers are distributed in such a manner that the midpoints of the approach points have an average spacing in each case with respect to the midpoints of the adjacent ran-out points which is largely of the same size for all these midpoints, with the approach points being regions on the plate beneath the downcomers.

6. Column in accordance with claim 5 wherein all plates have a similar arrangement of the downcomers, with the arrangements on adjacent plates being oriented differently in such a manner that a staggering of the approach points with respect to the run-out points is present.

7. Column in accordance with claim 6 wherein all downcomers of adjacent plates are arranged to be complementary; and in that the number of the approach and run-out points per plate can be different.

8. A downcomer for a plate column, which is largely centrally symmetrically formed with respect to an axis pointing in the column direction, the downcomer comprising:
   a ran-out opening which is located on a plate within an overflow weir;
   deflection elements for an inflowing liquid/gas mixture for the development of a circular flow;
   a passage part which leads to a next lower plate; and
   a cup at the lower end of the passage part for the accumulation of liquid flowing off;
   wherein the cup contains a plurality of apertures which are designed and arranged in such a manner that a largely uniform distribution of liquid flowing away to the next plate results; and
   wherein said cup is a vessel which is produced by deep drawing, with apertures being regularly distributed over its base.

9. A downcomer in accordance with claim 8 wherein the cup has a planar base in its middle region and a cylindrical wall at its periphery.

10. A downcomer in accordance with claim 8 wherein the apertures are circular holes.

11. A plate column with downcomers in accordance with claim 8, with a plurality of downcomers being provided per plate and with gas passage apertures for an exchange of material being arranged at all regions which are free of run-out points, wherein the downcomers are distributed in such a manner that the midpoints of the approach points have an average spacing in each case with respect to the midpoints of the adjacent run-out points which is largely of the same size for all these midpoints, with the approach points being regions on the plate beneath the downcomers.

12. Column in accordance with claim 11 wherein all plates have a similar arrangement of the downcomers, with the arrangements on adjacent plates being oriented differently in such a manner that a staggering of the approach points with respect to the run-out points is present.

13. Column in accordance with claim 12 wherein all downcomers of adjacent plates are arranged to be complementary; and in that the number of the approach and run-out points per plate can be different.

* * * * *